340-870.14
3/11/86 XR 4,575,720

United States Patent [19]
Smith

[11] Patent Number: 4,575,720

[45] Date of Patent: Mar. 11, 1986

[54] DATA ACQUISITION TRANSMITTER AND RECEIVER

[75] Inventor: David C. Smith, Jupiter, Fla.

[73] Assignee: Otis Elevator Company, Farmington, Conn.

[21] Appl. No.: 542,305

[22] Filed: Oct. 14, 1983

[51] Int. Cl.[4] ........................ H04Q 9/12; G08B 25/00

[52] U.S. Cl. .......................... 340/825.54; 340/870.14; 340/825.1; 340/825.14; 340/518

[58] Field of Search ........... 340/825.54, 825.1, 825.11, 340/825.14, 518, 538, 870.13, 870.14, 870.26, 825.76, 825.36; 370/113, 114, 103

[56] References Cited

U.S. PATENT DOCUMENTS

| | | | |
|---|---|---|---|
| 2,548,796 | 4/1951 | Houghton | 370/114 |
| 3,803,594 | 4/1974 | Klein et al. | 340/518 |
| 3,943,488 | 3/1976 | Kazahaya | 340/870.14 |
| 4,032,908 | 6/1977 | Rice et al. | 340/518 |

*Primary Examiner*—Donald J. Yusko
*Attorney, Agent, or Firm*—Robert E. Greenstien

[57] ABSTRACT

A transmitter has a plurality of parallel inputs, and each input is connected to a switch. The transmitter receives a trigger signal that has a constant frequency. Using the trigger signal, the transmitter provides a signal which consists of individual series signals, each one of the series signals representing the status of one of the switches. The series signal also includes a sync signal which precedes the series signals associated with the status of the switches. These series signals are generated in synchronism with the trigger signal that is applied to the transmitter. A receiver receives the series signals and also the trigger signal. The sync signal is detected in the receiver, and a status signal is generated in response to each of the series signals following the sync signal as those signals are received. Each status signal is applied to an input which is identified by the number of repetitions made by the trigger signal after the sync signal is detected. An alarm may be activated in response to the status signal on the receiver outputs, the number of which equals the number of inputs on the transmitter.

4 Claims, 4 Drawing Figures

DATA ACQUISITION TRANSMITTER AND RECEIVER

DESCRIPTION

1. Technical Field

This invention concerns communication systems that transmit data by a transmitter to a remote receiver.

2. Background Art

Prior art abounds that shows techniques for transmitting data from a transmitter to a remote receiver, either over wire or using RF. But, prior art techniques are generally extremely complicated, hence expensive, and, as a result, unsuited for providing simple data transmission over a pair of twisted wires, for example, between one building and another building for security surveillance.

One application for simple data transmission is in monitoring the status of various switches in a building (on doors and windows) and providing a status indication for each switch at a remote site. Communication may use a twisted pair of wires, which is inexpensive, easy to construct and maintain. Wireless communication may also be used. The prior art does not satisfy this need.

DISCLOSURE OF INVENTION

An object of the present invention is to provide a very simple and inexpensive telemetry (data transmission) system, one particularly suited for transmitting simple data over a twisted pair of wires, perhaps between one building and another, in monitoring the status of various switches in one of the buildings.

According to the present invention, a transmitter is connected to N (a plurality) switches. The transmitter and a remote receiver receive a fixed frequency trigger signal (e.g., an AC signal over a power line). In response to this AC signal, the transmitter provides an output signal which consists of a sync signal and individual series signals, each representing the status of one of the switches. These series signals are generated in synchronism with the fixed frequency trigger signal, and the transmitter output signal (the sync signal and the series signals associated with each switch) is transmitted to the receiver (over a wire pair in one embodiment). At the receiver the sync signal is separated, and a status signal is generated for each series signal as it is received. Each of these series status signals is applied to a different receiver output in a sequence determined by the number of repetitions made by the trigger following the received sync signal. Thus, for example, the status of one of the switches will appear at a particular time slot following the sync signal when transmitted from the transmitter and will cause an output signal associated with the status of that switch to appear on a receiver output that is identified by the same time position following the received sync signal. For each switch there is an individual output that provides an indication of its status and communication between the transmitter.

A feature of the invention is that it is extremely inexpensive; another, it is simple to construct and install in comparison to other techniques, such as pulse width modulation or data encoding.

Other objects, benefits and features of the invention will be apparent to one skilled in the art from the following description and claims.

BEST MODE FOR CARRYING OUT THE INVENTION

Figure 1A:
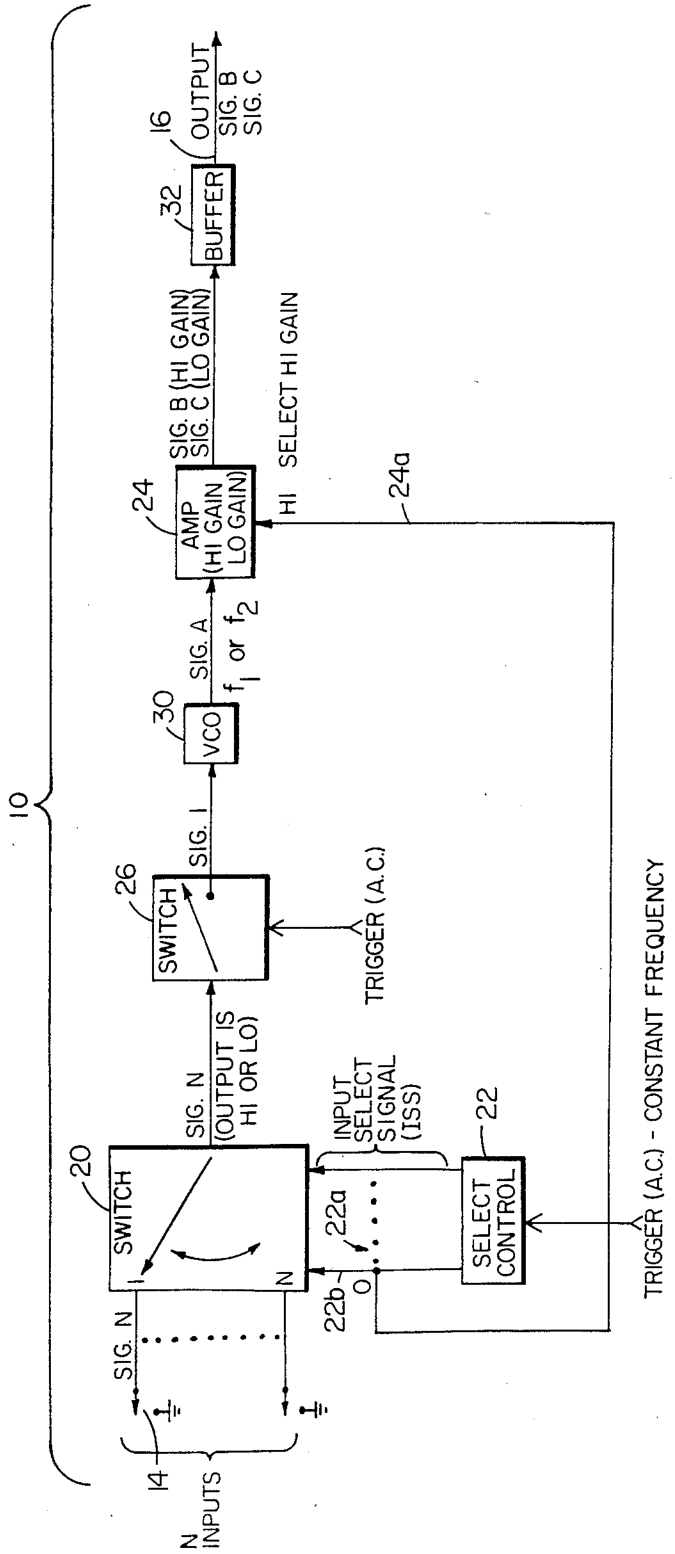
FIG. 1A–B is a functional block diagram of a data acquisition. transmitter and receiver system that embodies the present invention.
Figure 1B:
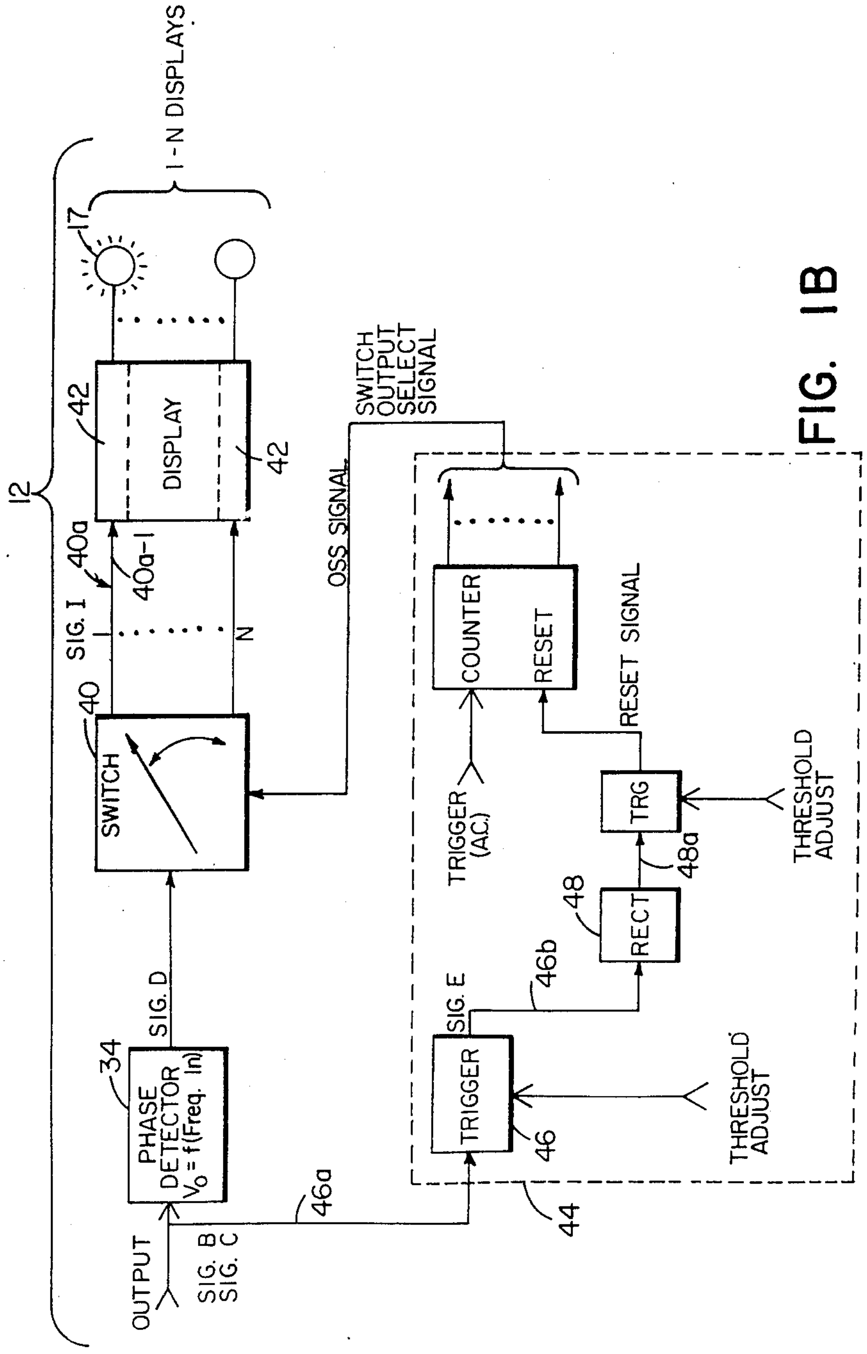

FIG. 1A–B shows a data communication system that includes a data acquisition transmitter 10 and receiver 12 for selecting from a plurality of parallel inputs 14 (switches) and sending serial data signals over a line 16 (the line is one of a pair of lines wherein one is at ground; only the signal carrying line 16 is shown) to illuminate one of a plurality of displays 17 to indicate the status of the switch. The inputs here comprise a plurality of switches, any one of which may be in an open and/or closed position at any instant in time. As part of a security system, the switches may be located in a building, and connected to windows, doors, and the like, to indicate if the door or window is open or closed.

FIG. 1A shows that the transmitter 10 is located generally in the vicinity of the switches, while the receiver (FIG. 1B) is located remotely from the transmitter, perhaps several miles away. The line 16 may be one in a simply twisted pair. (As developed below, RF communication may be used between the transmitter and receiver, as an alternative "wireless" application of the invention.)

A programmable switch 20 in the receiver senses the status of each of the input switches (of which there are N). The input that is selected is determined by the output from a select control circuit 22 that provides an input select signal, the ISS signal, to the programmable switch. The ISS signal, a digital address, identifies one of the N input signals, and the SIG N signal appears on the output of the programmable switch; it may be high or low, depending on the status of the switch input.

Figure 2:
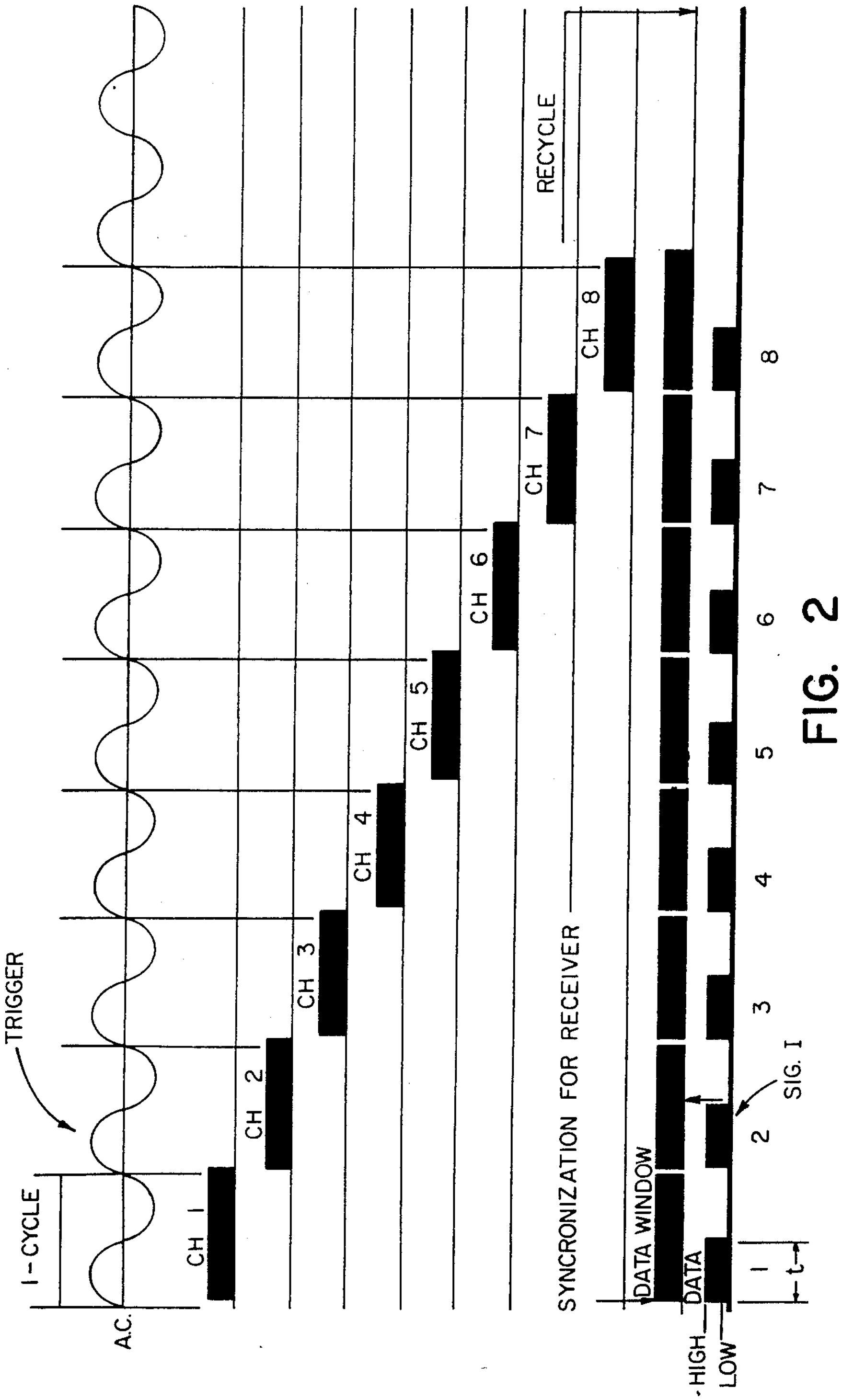
FIG. 2 shows various waveforms and signals on a common time base.

The ISS signal is generated synchronously from a constant frequency trigger signal (AC), and in the preferred utilization of the invention, this AC signal is derived directly from the 110 volt AC wall power. As the AC signal is received at select control, different ISS signals are synchronously produced, each one identifying one of the inputs to the switch, and for this purpose the select control may be a binary counter that counts to N. The SIG N signal (as stated previously, it may be high or low) is generated synchronously with the AC signal, and FIG. 2 helps demonstrate this by showing the AC trigger signal at the top and for each full cycle of the AC signal an input selection "window" that defines one channel. Observe, in FIG. 2, that there are eight channels (in other words, N is equal to 8). In the first cycle of the AC signal, channel 1 appears on the output of the switch (as the SIG N signal N=1) and may be high or low, depending on the first switch's status. Similarly, during each successive cycle a different channel appears on the output of the switch, and after eight (SIG N, where N=8), the cycle starts over again at 0.

The select control output consists of a plurality of lines **22*a*, and the number should be sufficient to identify between 0 and N inputs. One (22*b*) of these lines (the least significant bit) is used to derive a signal, called the "select high gain" signal. That signal is produced when there is a transition from 0 to 1, for example, on line 22***b*, which occurs when the ISS signal resets (goes to zero) after the last channel is selected. The select high gain signal is supplied to a variable gain amplifier 24, and it switches from a first gain (low gain) to a higher gain in response to the select high gain signal appearing on the line 24*a*.

The SIG N signal is supplied to a second switch 26, but this is simply a single pole switch; it is opened or closed depending on the status of the trigger (AC) signal. The output of this second switch is the signal SIG 1, which reflects the status of the SIG N signal, but only for half of one cycle (see FIG. 2). This happens because the switch is activated only as long as the AC signal is either positive or negative, but not both. It thus creates a window, so to speak, which is only one-half of the AC cycle, or for time "t", and in this window the status of the SIG N signal appears on the output switch as the SIG 1 signal. This sampling window with a time of "t" is approximately one-half the time width associated with the SIG N signal, and therefore any jitter (or time shift) in the SIG N signal will not cause a data loss. This means that if there is some slight jitter or movement or variation in the width of the SIG N signal, the SIG 1 signal will still, nonetheless, appear either high or low accordingly.

Figure 3:
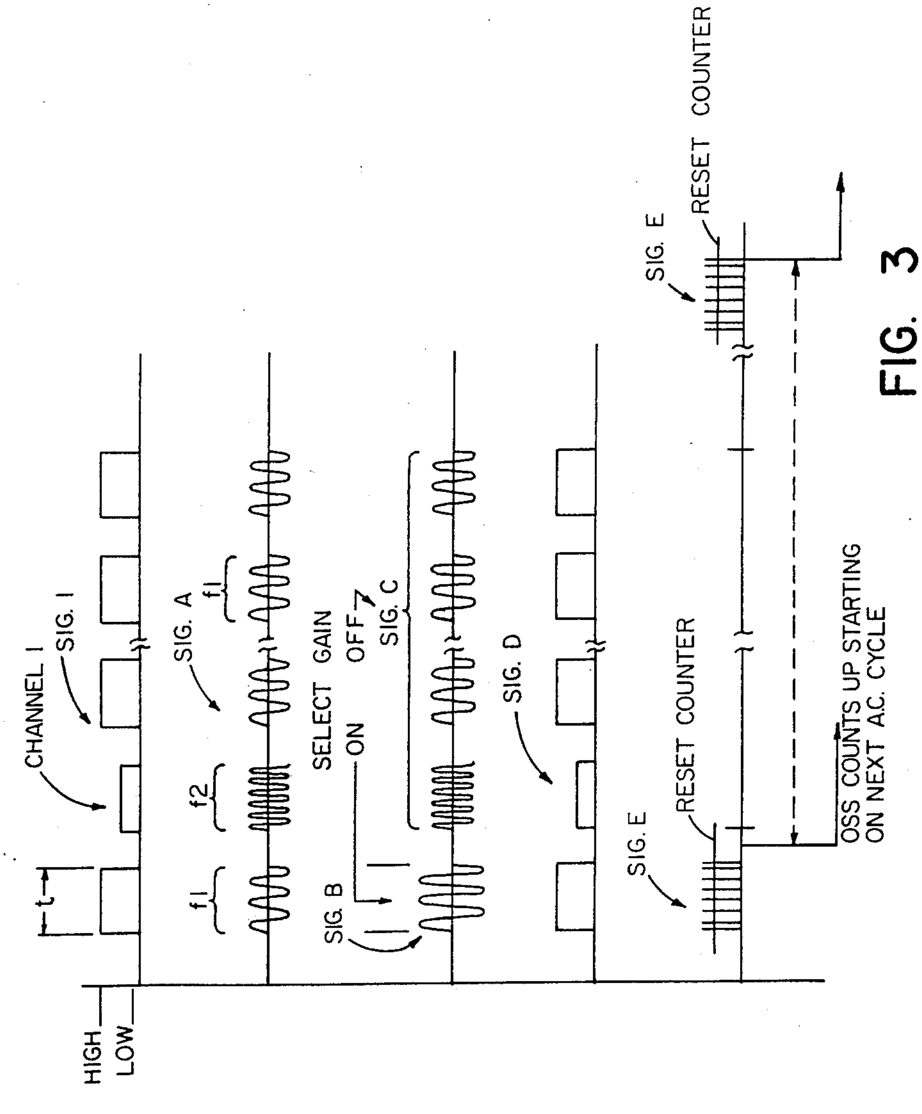
FIG. 3 shows other waveforms on a common time base.

The SIG 1 signal (it is either high or low depending on the status of the channel which was immediately selected) is supplied to a voltage controlled oscillator 30 (VCO) whose output is the signal SIG A (a tone burst) which varies between a first frequency f1 and a second frequency f2 depending upon whether the SIG 1 signal is high or low at any instant (see FIG. 3). The SIG 1 signal is supplied to the variable gain amplifier 24, and its gain can be varied between a first level high and a second level low depending on the status of the select high gain signal that is supplied to its control input terminal over the line 24*a*. For channels 1–N (in FIG. 2, channels 1–8) the gain of this amplifier is low, and the AC signal consists of a short burst of sine waves at either f1 or f2—but in either case at the same amplitude. If channel 1 is high, the frequency will be f1; if it is low, it will be f2 (see FIG. 3). But, when the select high gain signal is high, the AC signal (at either f1 or f2) has an amplitude higher than the other AC signals which follow it, and this happens only when the select high gain signal goes high, which occurs when the programmable switch is in position immediately prior to the selection of the channel 1. Thus, the higher level signal, signal SIG B, acts as a synchronization signal, preceding the SIG C signals, each of which indicates (depending upon its frequency) the status of one of the N channels (see FIG. 3). The output from the variable gain amplifier is supplied to a buffer amplifier 32 (well known in the art), and its output, SIG B and SIG C, is supplied over the line 16 to the receiver 12, which may be miles away. At the receiver, a phase detector 34 receives the SIG B and SIG C signals and produces the output signal SIG D whose voltage identifies the frequency. The result is that SIG D consists of a train of pulses in synchronism with the SIG C signal, but whose amplitude is a function of the instantaneous frequency of SIG C (see FIG. 3). Thus, SIG D provides a train of pulses, and each pulse may have two possible amplitudes to indicate the status of the one of the N inputs to which it corresponds to. The SIG D signal is supplied to a second programmable switch 40, and like the first programmable switch 20 in the transmitter, it scans or selects one of N possible output positions 40*a*. Each of these drives a display drive 42 that drives one of the N possible displays 17 (e.g., lamps). Each of these displays is associated with one of the switches and indicates if energized that the switch is open or vice versa. To do this correctly, the switch 40 must operate in synchronism with the SIG C signal; that is, when it is in position 1, the instantaneous SIG D signal must show the status of channel 1 at the transmitter, and likewise, when it is at position N, the status of channel N (switch N). This is accomplished quite cleverly. The SIG B signal (which acts as a synchronizing signal) is supplied in a sync separator 44. There the SIG B signal is supplied to a Schmidt trigger 46 which has an adjustable threshold voltage. The SIG B signal is, of course, a higher amplitude than the SIG C signals (see FIG. 3), and by adjusting the threshold correctly, the trigger will fire only when the SIG B signal is received on the line 46*a*, producing the signal SIG E. This signal SIG E (see FIG. 3) will also consist of a train of pulses (because SIG B also consists of an AC signal), and these pulses are supplied, on the line 46*b*, to a rectifier 48. The rectifier's output consists of a DC signal on its line 48*a* which rises during the time that the SIG B signal is generated. (During this time no SIG C signals have yet been transmitted over the output because they follow the SIG B signal in the serial transmission between the transmitter and receiver.) The output from the rectifier is supplied to a trigger (monostable) 49 which fires at a certain DC level on the line 48*a*. The trigger's output, the RESET signal, is furnished to the "reset" input of a binary counter 52, and the counter's clock input (CLK) is obtained from the common AC power supply. (That AC signal to the counter is obviously the same trigger AC signal used to drive the select control and the transmitter (in FIG. 1A) because they are derived from the same power system.)

Following a transition in the RESET signal (e.g., termination of the SIG B signal), the counter begins to immediately start counting up from N—in synchronism with the AC signal. The output from this counter is a binary switch output select signal (the OSS signal) and it is supplied to the switch input at 40*a*. The OSS signal identifies one of the switch's N outputs. For instance, on a count of 1, it will cause the switch to apply the SIG D signal (it may be high or low) to the line 40*a*-1 (for switch 1) and the SIG 1 signal on line 40*a*-1 thus will identify the status of channel 1 on the transmitter output. This sequence continues as the trigger AC signal causes the counter to incrementally count up from 1 to N and provide a corresponding OSS signal which identifies one of the N outputs on the switch. When the SIG B signal is again received, the procedure starts over, the counter then being reset to 0, at which it is ready to apply the SIG D signal to the switch 40 channel 1 output on the first count after reset.

The display drive receives the SIG 1 signals from the N outputs from the switch 40. Depending upon the status of any one at a time, it either illuminates or does not illuminate one of the 1 through N displays. Thus, if there are, for example, 8 lamps and one of the 8 switches to the switch in FIG. 1A is open, the lamp preferably will go on, thereby providing a remote indication that that switch 8 has been actuated and thus perhaps indicates that there has been entry into the dwelling.

The system thus allows for remote monitoring using a simple pair of wires. It could also be used in a wireless system. All that is required is the common AC trigger source at the transmitter and receiver to synchronize the transmitted and received data.

Using the foregoing description, one skilled in the art may be able, of course, to make variations and modifications to the system, without departing from the true scope and spirit of the invention.

I claim:

1. A communication system comprising:

a transmitter with N inputs and one output, N being more than one;

a remote receiver with one input and N outputs; characterized in that:

said transmitter comprises means for providing a serial output signal on said output which comprises N signals preceded by a sync signal in synchronism with a fixed frequency trigger applied to the transmitter, each of said N signals being associated with one of the N inputs and produced on a particular repetition of said trigger signal following production of said sync signal, said sync signal preceding said N signals;

said receiver receives said transmitter serial output signal and said trigger signal and comprises means for providing a status signal on each of its N outputs for each of said N signals, means for providing a second sync signal in response to the presence of said sync signal in said transmitter output signal, means for generating a status signal from each one of said N signals as said one of said N signals is received, and means for applying said status signal to one of the N receiver outputs in response to said trigger signal and said second sync signal, said one receiver output being identified by the number of trigger signal repetitions following the said second sync signal.

2. A communication system as described by claim 1, characterized in that, the transmitter comprises:

a switch for providing a voltage to each transmitter input;

a second switch for providing a first output signal that is selected from one of the inputs to the transmitter in response to a first control signal that identifies the selected input;

a counter for receiving the trigger signal and providing the first control signal, which represents the number of repetitions made by the trigger signal starting from zero to a maximum equalling the number of inputs;

means for providing a first AC signal in response to the first output signal, the frequency of the first AC signal manifesting the magnitude of the first output signal;

means for receiving the first AC signal and providing a second output signal at the same frequency at a first amplitude but at a second higher amplitude in response to the first control signal representing zero repetitions of the trigger signal; and the receiver comprises:

means for providing a third output signal whose magnitude manifests the frequency of the first AC signal;

means for providing a synchronizing output signal in response to a first AC signal that is above a set amplitude;

a counter that receives said synchronizing output signal for providing, in response to the trigger signal, a counter output signal that represents the number of repetitions of the trigger signal after the synchronizing output signal; and a third switch for receiving the third output signal for providing the third output signal on a line in response to a counter output signal identifying that line.

3. A communication system as described by claim 2, characterized by:

the means for providing the synchronizing output signal comprises means for providing a pulse each time the first AC signal exceeds a certain level and means for rectifying and integrating said pulses.

4. A communication system as described in claim 1, characterized in that the trigger signal has a certain period and the transmitter comprises, means for receiving a DC signal that has a duration of approximately that period and represents the status of one input to the transmitter, and means for providing a first output signal manifesting the level of that DC signal in an interval of less than that one period.

* * * * *